United States Patent [19]

Nagase et al.

[11] 4,139,182
[45] Feb. 13, 1979

[54] SPRING DEVICE

[75] Inventors: Toshiro Nagase, Sagamihara; Hiroshi Miyazawa, Hiratsuka, both of Japan

[73] Assignee: Tokico Ltd., Kawasaki, Japan

[21] Appl. No.: 744,798

[22] Filed: Nov. 24, 1976

[30] Foreign Application Priority Data

Nov. 26, 1975 [JP] Japan .................... 50-159756[U]

[51] Int. Cl.² ............................................. F16F 9/49
[52] U.S. Cl. ..................................... 267/120; 16/51;
91/395; 188/284; 188/285; 188/315; 188/318;
267/64 R
[58] Field of Search ............... 188/284, 285, 286, 318,
188/315, 269; 267/64 R, 65 R, 124, 139, 120;
16/51, 52, 66; 293/DIG. 2; 91/395; 49/386;
296/56

[56] References Cited

U.S. PATENT DOCUMENTS

| 2,619,199 | 11/1952 | Schwary ...................... 188/284 |
| 3,024,874 | 3/1962 | DeKoning et al. ............... 188/286 |
| 3,034,482 | 5/1962 | Rader ........................ 91/405 X |
| 3,661,236 | 5/1972 | Wossner ..................... 188/269 X |
| 3,885,654 | 5/1975 | Hauswirth .................... 188/284 |

FOREIGN PATENT DOCUMENTS 746696  3/1956  United Kingdom ..................... 91/395

Primary Examiner—George E. A. Halvosa
Attorney, Agent, or Firm—Wenderoth, Lind & Ponack

[57] ABSTRACT

A spring device including a piston slidably disposed in an inner cylinder of a dual inner and outer cylinder with a piston rod secured thereto and extending to the outside of the cylinder through a rod guide closing one end of the inner cylinder, an oil passage formed in the rod guide and connecting an annular chamber between the inner and outer cylinders with the interior of the inner cylinder, and a device for supplying a force on the piston to project the piston rod outwardly, in which a guide member is supported on the piston rod with a coil spring interposed between the guide member and the piston, and the guide member is adapted to contact the rod guide to control the oil flowing through the oil passage when the piston rod moves outward by a predetermined amount.

1 Claim, 2 Drawing Figures

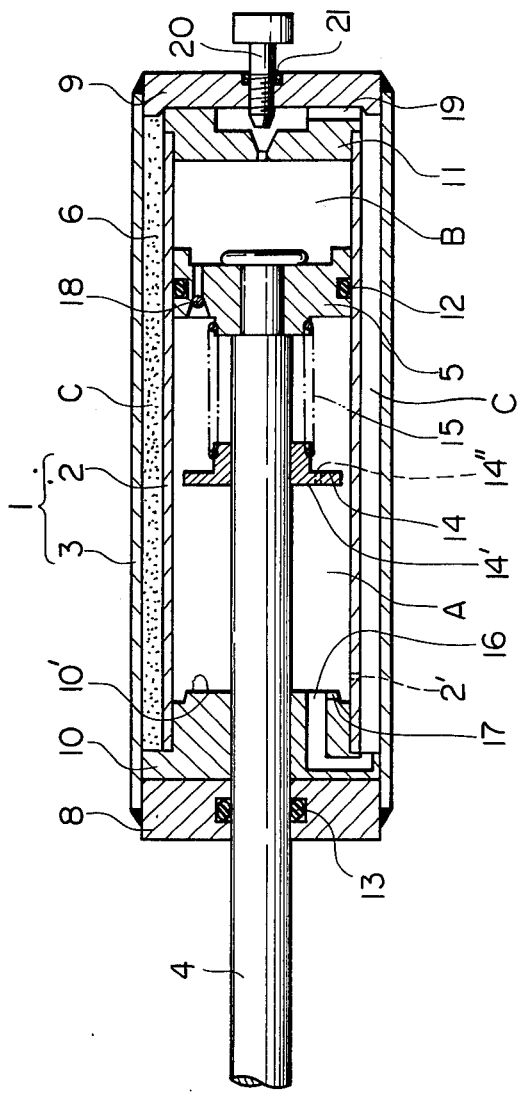

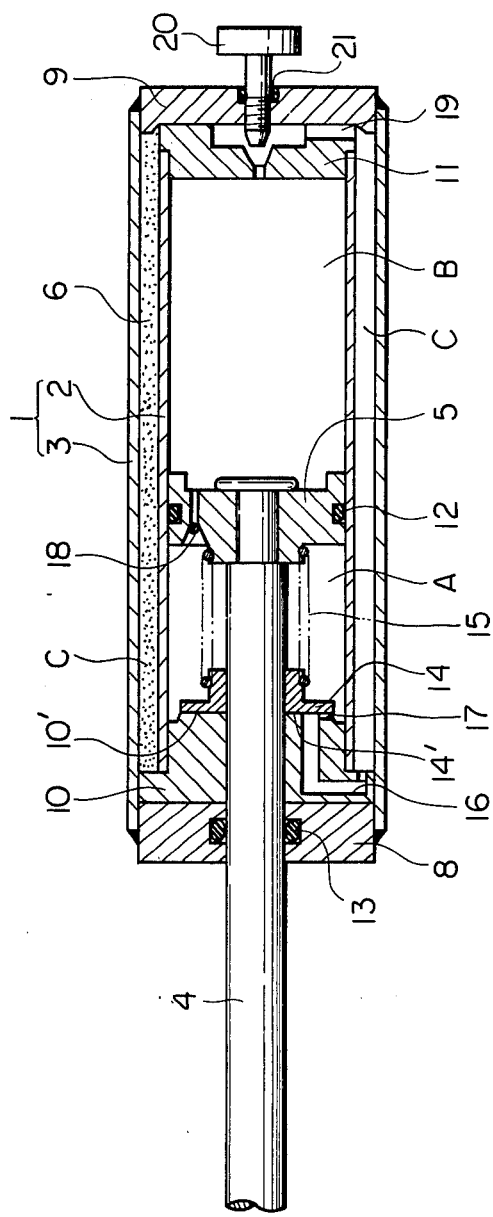

SPRING DEVICE

This invention relates to a spring device and, particularly to a spring device of the type which is adapted for use, for example, in a door closer or a rear panel raising device of an automobile.

When a spring device of this type is used, for example, in a door closer or a device controlling movement of a door, it is usually required to move the door in the door closing direction after the door has been opened relatively quickly from the beginning of the movement to an almost fully closed position and thereafter concentric slowly and smoothly to the fully closed position.

An object of the present invention is to provide a spring device which can satisfy the aforementioned requirements.

One embodiment of the present invention is shown in the drawings in which:

FIG. 1 is a longitudinal cross-sectional view of a spring device according to the present invention; and FIG. 2 is a view similar to FIG. 1 but showing the spring device working under conditions different from those of FIG. 1.

The spring device shown in the drawings comprises a main body 1 consisting of an inner tube 2 and an outer tube 3 forming a concentric inner-and-outer tube structure. A piston 5 secured on one end of a rod 4 is slidably fitted within the inner wall of the inner tube 2 to partition the interior of the inner tube 2 into oil chambers A and B. The oil chambers A and B are filled with hydraulic oil, and hydraulic oil and high pressure gas 6 fill an annular chamber C defined between the inner tube 2 and the outer tube 3. Opposite ends of the outer tube 3 are sealingly closed by end caps 8 and 9 respectively. A rod guide 10 and an end plate 11 disposed respectively on the inside of the end caps 8 and 9 sealingly engage with opposite ends of the inner tube 2. The other end of the rod 4 passes through the rod guide 10 and the end cap 8 and extends to the outside of the spring device. Shown at 12 is an O-ring around piston 5 sealing off the oil chambers A and B from each other, and at 13 is an O-ring sealing the piston rod 4 against escape of the pressure in the spring device to the outside.

A guide 14 is disposed in the oil chamber A through which the rod 4 extends and the guide 14 is slidably supported on the rod 4 with a coil spring 15 having a weak spring-constant interposed between the guide 14 and the piston 5. The guide 14 is normally in a position spaced from the piston 5 a distance defined by the free length or the most extended length of the spring 15. The high pressure gas 6 enclosed in the annular chamber C acts as a pressing force on the rod 4 in the direction to project it out of the main body 1 by pressurizing the interior of the main body 1 and to compensate for variation in the volume of the space of the interior of the main body 1 caused when the rod 4 moves into and out of the main body 1.

In the embodiment the rod 4 is urged outwardly by the high pressure gas 6. Alternatively, a coil spring may be positioned between the piston 5 and the end plate 11 to provide the required pressing force on the rod 4, in which case it becomes possible to eliminate the gas 6.

An oil passage 16 is formed in the rod guide 10 for connecting the oil chamber A with the annular chamber C and, an orifice passage 17 is formed in a generally flat end surface 10' of the rod guide 10 to constitute an orifice for controlling oil flow through the oil passage 16 when the opening of the passage 16 formed in the surface 10' is closed due to engagement by the generally flat end surface 14' of the rod guide 14. A one way valve 18 is formed in the piston 5 for allowing flow of hydraulic oil across the piston from the oil chamber B to the oil chamber A only. An oil passage 19 is formed in the end plate 11 for connecting the annular chamber C with the oil chamber B, and the cross-sectional area of the passage 19 can be changed by an adjusting valve 20 having a tapered end cooperating with a complementary shaped valve seat formed in the passage 19. The valve 20 acts to control the speed of the piston 5 in the movement in the leftward direction in the drawings. Shown at 21 is an O-ring sealing the adjusting valve 20.

The spring device having this construction operates as follows:

The spring device is connected with a door through a transmission mechanism consisting of, for example a pinion and a rack (not shown) so that the rod 4 moves into and out of the cylinder 2 when the door opens and closes.

When the door opens the rod 4 moves into the cylinder 2 and the piston 5 moves rightward in the cylinder 2. The check valve 18 opens and hydraulic oil flows freely from the oil chamber B to the oil chamber A through the valve 18, and pressurized gas 6 is compressed to compensate for ingress of the rod 4 into the cylinder 2, and thereby the high pressure gas 6 is available as a door closing force or a force acting to project the rod outwardly.

When the door opening force is released the rod 4 and the piston 5 are moved leftward in the drawing due to the force exerted by the high pressure gas 6. The check valve 18 closes to disconnect communication between the oil chambers A and B and oil in the oil chamber A flows out into the annular chamber C through the passage 16 and oil in the annular chamber C flows into the oil chamber B through the passage 19 and the adjusting valve 20 which generates a desired amount of resistance to the flow of the hydraulic fluid passing through the valve to control the speed of the piston 5, thus controlling the door closing speed.

Upon sufficient movement of the piston 5 in the leftward direction, the end surface 14' of the guide 14 comes in contact with the flat end surface 10', as seen in FIG. 2, of the rod guide 10 so that the oil passage 16 is closed by the guide 14 with the restricted passage 17 being left therebetween. The large resistance afforded by the passage 17 substantially reduces the speed of the piston 5 in the last stage of the door closing movement. When the end surface 14' of the guide 14 contacts the end surface 10' of the rod guide 10, pressure in the oil chamber A increases steeply which acts to urge the guide 14 against the rod guide 10 tightly, and the piston 5 moves leftward with the spring 15 being compressed.

The spring device of the embodiment is arranged for use in a horizontal position, but the device may be used in a vertical position by disposing an oil pipe in a position extending from the passage 16 through the high pressure gas 6 into the hydraulic oil in the annular chamber C.

The passage 17 in the present embodiment is formed as a cut-out portion in the rod guide 10. But the passage 17 may be replaced by an orifice 14" formed in the guide 14 at a position as shown in FIG. 1. Alternately, an orifice 2' may be formed in the wall of the cylinder 2 for effecting a function similar to that of the passage 17.

The spring device according to the present invention having the construction as described hereinbefore has the following functional effects:

(a) The time at which the closing speed of the door changes to its terminal speed can be easily selected by adjusting the free length of the spring disposed between the guide and the piston.

(b) The terminal closing speed of the door is attained by closing an oil passage by means of a guide contacting the rod guide; thus, the spring device is simple in construction and can be manufactured economically.

What is claimed is:

1. A spring device for controlling the opening or closing speed of a door or a window, comprising:

concentric inner and outer cylinders in a horizontal attitude and having an annular space therebetween;

a piston slidably mounted in the inner cylinder and a piston rod secured thereto and extending to the outside of the cylinder, said piston partitioning said inner cylinder into two oil chambers, said piston having a passage therethrough with a check valve therein for allowing flow of oil when the piston is moving in the contracting stroke of the device and blocking flow in the extension stroke of the device;

closure members closing opposite ends of the inner and outer cylinders respectively and having oil passages therein connecting said oil chambers respectively with said annular space;

pressurized gas enclosed in the upper portion of the annular space for applying a force on the piston for projecting the piston rod outwardly of said device;

a guide slidably supported on the piston rod in one oil chamber, said one oil chamber being the oil chamber through which the piston rod extends;

a spring disposed between said piston and said guide for normally locating said guide at a position spaced from the piston;

said guide having a face engaging said closure member in said one oil chamber for closing the oil passage from said one oil chamber when the piston rod moves outwardly a predetermined amount;

said closure member for said one oil chamber having a reduced diameter portion projecting into said one oil chamber and the oil passage for said one oil chamber opening into said one oil chamber through the face of said projection facing the interior of said one oil chamber;

said guide having a diameter less than the inner diameter of said inner cylinder and the guide face being large enough to cover said oil passage opening;

an auxiliary oil passage means for permitting a restricted flow of oil from said one oil chamber to said annular space when said guide engages said closure member, said auxiliary oil passage means having a groove with a cross-sectional area less than that of said oil passage in one of said faces, and said groove radially extending across said face from the position of said oil passage and opening at the outer, radial edge of said face, whereby said oil passage is prevented from being totally blocked by said guide when said guide abuts said projection on said closure member; and an adjustable valve in the oil passage for the other oil chamber.

* * * * *